March 2, 1965 J. A. LAUCK 3,171,358
GEAR TYPE PUMP
Filed June 3, 1963 2 Sheets-Sheet 1

INVENTOR.
JOHN A. LAUCK
BY
Oberlin, Maky & Donnelly
ATTORNEYS

March 2, 1965   J. A. LAUCK   3,171,358
GEAR TYPE PUMP
Filed June 3, 1963   2 Sheets-Sheet 2
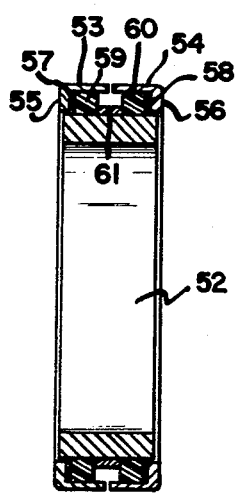
FIG_8
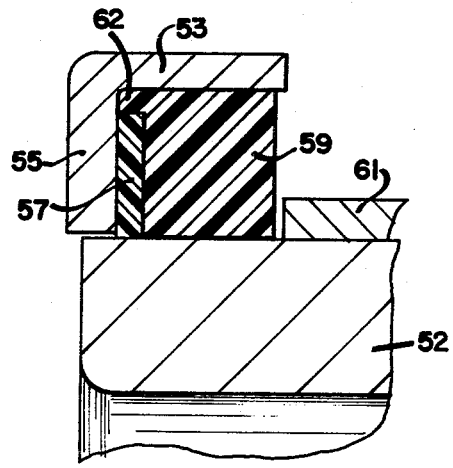
FIG_9
FIG_10
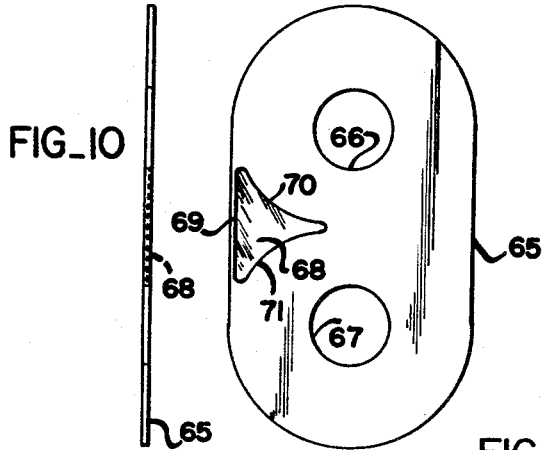
FIG_11
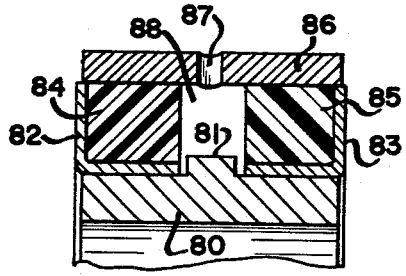
FIG_12
INVENTOR.
JOHN A. LAUCK
BY
Oberlin, Maky & Donnelly
ATTORNEYS United States Patent Office 3,171,358
Patented Mar. 2, 1965

3,171,358
GEAR TYPE PUMP
John A. Lauck, Benton Harbor, Mich., assignor to Lear Siegler, Inc., Santa Monica, Calif., a corporation of Delaware
Filed June 3, 1963, Ser. No. 285,097
11 Claims. (Cl. 103—126)

This invention relates generally, as indicated, to a gear type pump and more particularly to certain improvements in such pumps of the pressure loaded type.

In gear type pumps, it is generally conventional to pressure load flange bushings or multi-part thrust plates and to employ compensating means for controlling the pressure areas on such plates. However, such prior art pumps are quite complex and difficult to assemble and disassemble. Moreover, movable pressure loaded bushings or bearings create a number of wear problems and often contribute to pump failure.

In contradistinction, it is a principal object of the present invention to provide a pressure loaded gear pump employing one-piece thrust plates and non-movable bearings.

It is another principal object to provide a pressure loaded gear pump incorporating unique sealing rings in the cover which are eccentrically located with respect to the respective gears so that the area exposed to the high pressure on the back side of the thrust plate is greater on the outlet side of the pump than on the inlet side.

It is a further object to provide a unique interfitting sealing ring and bearing combination permitting such rings to be thus optimally eccentrically located.

It is a still further object to provide a pressure loaded gear type pump having a pump body and cover plate with the cover thrust plate being supported on the parting face therebetween.

Yet another object is the provision of a unique sealing ring between the pump cover and the cover thrust plate.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 8 is a transverse section of a further form of sealing ring that may be employed with the present invention;

FIG. 9 is an enlarged detail view of such sealing ring in a pressure loaded condition;

FIG. 10 is a side elevation of a slightly modified cover thrust plate;

FIG. 11 is an end elevation of such modified cover thrust plate as seen from the right in FIG. 10; and FIG. 12 is a fragmentary transverse section of yet another form of sealing ring that may be employed with the present invention.

Figure 2:
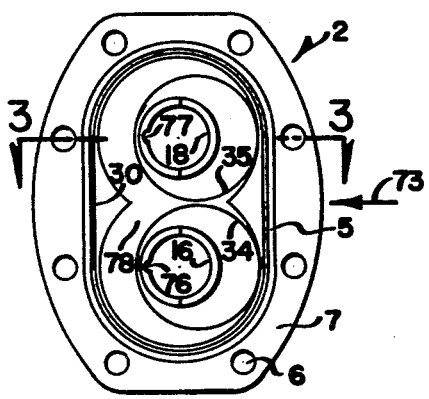
FIG. 2 is an end elevation of the cover for such pump taken substantially on the parting line 2—2 of FIG. 1 between the pump cover and body.
Figure 1:
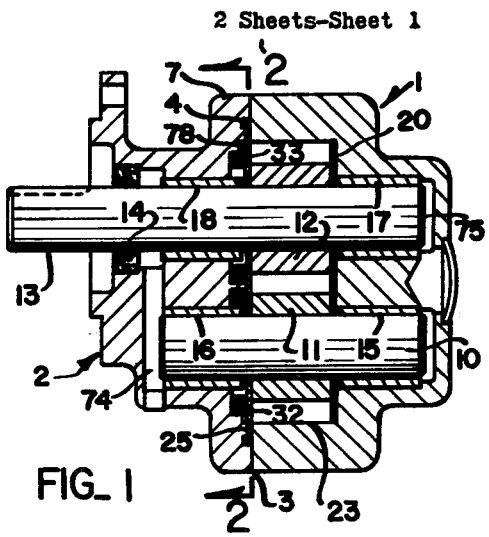
FIG. 1 is a vertical section of a pressure loaded gear type pump in accordance with the present invention.
Figure 3:
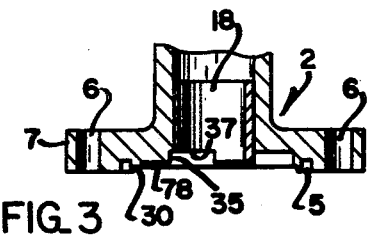
FIG. 3 is a fragmentary horizontal section taken substantially on the line 3—3 of FIG. 2.

Referring now to the annexed drawings and more particularly to FIGS. 1, 2 and 3, there is illustrated a gear type pump which comprises a body 1 and a cover 2 forming the housing of the pump. The cover and housing meet in a parting plane 3 and the plane or interface therebetween is sealed by a sealing ring 4 mounted in a groove 5 in the cover 2. The body and cover may be firmly held together by suitable fastening means passing through apertures 6 in the peripheral flange 7 of the cover 2. Within the housing in this manner formed, there is mounted gear shaft 10 having gear 11 mounted thereon which is in mesh with gear 12 mounted on pump drive shaft 13. Shaft 13 projects through shaft seal 14 in the cover 2 to extend therebeyond so that a suitable driving connection may be connected to such projecting end and shaft 13 is somewhat longer than the shaft 10. The shaft 10 is mounted in non-movable bushings 15 and 16 in the body and cover, respectively. Similarly, the shaft 13 is mounted in non-movable bushings 17 and 18 in the body and cover, respectively. Whereas sleeve-type bearings are illustrated, it will readily be understood that roller-type bearings may be employed.

Figure 5:
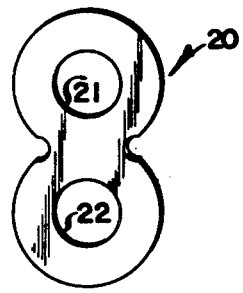
FIG. 5 is an enlarged perspective view of the body thrust plate.
Figure 6:
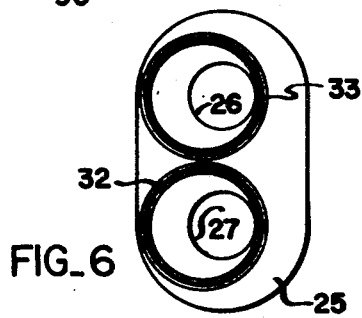
FIG. 6 is an end elevation of the cover thrust plate illustrating the position of the sealing rings thereon.

The thrust loads of the gears 11 and 12 are taken on the body by means of a body thrust plate 20 of the figure-eight configuration shown more clearly in FIG. 5. Such body thrust plate has apertures 21 and 22 therein accommodating the shafts 13 and 10, respectively. The body thrust plate 20 fits in the bottom or end of the figure-eight recess or pumping cavity 23 in the body 1 accommodating the gears 12 and 11 which are in mesh. A cover thrust plate 25 is provided on the opposite side of the gears and such plate is slightly larger and rests peripherally on the body-cover parting face 3 of the body 1. Like the body thrust plate 20, the cover thrust plate 25 is provided with circular apertures 26 and 27 accommodating the shafts 13 and 10, respectively. Since the cover thrust plate 25 is slightly larger and does rest on the body parting face 3, it is desirable to control the clearance between the body thrust plate 20 and this parting surface 3 so that the over-all end clearance of the gears is from .000 to .002 inch.

To accommodate the cover thrust plate 25 in the cover 2 there is provided a milled recess 30 as seen in FIGS. 2 and 3 which, in the illustrated embodiment, may be from .098 to .103 inch deep and is of the same peripheral configuration as such plate 25. The cover thrust plate 25 thus fits within the recess 30 in the cover 2 peripherally bearing against the parting face 3 of the body 1 and covers the sides of the gears 11 and 12.

Between the cover thrust plate 25 and the cover 2 there are provided two annular seals 32 and 33. Both of these annular seals surround the cover bearings 16 and 18, respectively, and are eccentrically disposed with relation to the shaft 10 and the drive shaft 13. Such seals are received in correspondingly eccentrically located annular recesses or counterbores 34 and 35, respectively, in the cover 2. In the illustrated embodiment, the recesses 34 and 35 may be approximately from .285 to .290 inch deep, i.e. the bottoms of such recesses will be spaced such distance from the parting face 3 of the body 1.

Figure 4:
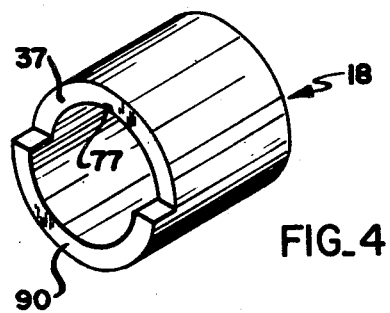
FIG. 4 is an enlarged perspective view of one of the bearings illustrating the cut-away portion thereof.

Because of the desired location and dimension of the internal diameters of the seals 32 and 33, it is necessary to mill away one-half of the projecting portions of the bearings 16 and 18 in order to assemble the sealing rings in the cover 2. As seen in FIGS. 2, 3 and 4, one-half of the portion of the bearing 18 which projects into the recess 35 is milled away as shown at 37 and this will then accommodate the sealing ring 33 fitting within the recess 35 between the shaft 13 and the peripheral wall of such recess 35. The sealing rings in this manner can be disposed on one side as close as possible to the shafts 10 and 13.

Figure 7:
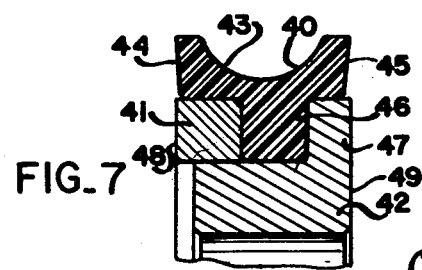
FIG. 7 is an enlarged fragmentary radial section of one form of sealing ring that may be employed with the present invention.

In the embodiment of the sealing ring illustrated in FIGS. 1 and 7, it is apparent that the ring is made up of three pieces. The outermost member 40 is a synthetic material ring which mates with two metal rings 41 and 42. The ring 40 may be made of neoprene, polyurethane, nylon, or other suitable synthetic or rubber pliable material. The ring 40 has an outwardly directed concave surface 43 between two slightly laterally flaring edges 44 and 45. An inwardly directed stem 46 projects between the ring 41 and flange 47 extending radially outwardly from one side of the ring 42. The ring 40 thus mates with the two metal rings 41 and 42. The purpose of the double metal ring 41, 42 is twofold, namely, to support the synthetic ring 40 so that the pressure on the outer side of the ring 40 will not collapse the synthetic material, and since the synthetic material is noncompressible, the hydraulic forces exteriorly of the seal will tend to spread the two steel rings apart so that there will be no clearance or gap through which the synthetic material can extrude. The lateral faces 48 and 49 of the rings 41 and 42, respectively, will thus be forced into firm engagement with the bottom of the recesses 34 and 35 and the outer surface of the cover thrust plate 25. Atlhough it is not the purpose of the present invention to augment the pressure loading on the plate 25 by means of the ring seals, it is apparent that such augmentation does, in fact, occur. The purpose of the multiple piece seal ring is to separate the metal parts to form a perfect metallic seal and prevent the synthetic material from extruding, particularly at high pressures. In the FIG. 7 embodiment of the seal ring, the radial pressure loads on the concave surface 43 create the lateral or thrust loads forcing the rings 41 and 42 apart.

However, in the FIG. 8 embodiment, the loads on the sealing ring are strictly axial and there is no translation of a radial pressure into axial thrust loads. Such FIG. 8 embodiment comprises an inner metal annular ring 52 supporting thereon two L-shaped rings 53 and 54 having radially inwardly directed edge flanges 55 and 56, respectively, the inner edges of which have a .001 to a .002 clearance with the O.D. of the ring 52. Annular fiber rings 57 and 58 are interposed between such flanges 55 and 56 and inner seal rings 59 and 60 of the aforementioned synthetic material. Such rings 59 and 60 are separated by a band or ring 61 surrounding the inner ring 52.

The fiber rings 57 and 58 have an interference fit with the O.D. of the ring 52 by as much as .000 to .005 inch so that there will be no clearance between the members 57 and 58 and the ring 52 through which the material of the seal rings 59 and 60 can extrude. Furthermore, the seal rings 59 and 60, under pressure, will be forced between the O.D. of the fiber rings 57 and 58 and the axially extending legs of the rings 53 and 54 as seen at 62 in FIG. 9 to maintain such interference fit and accordingly provide a positive seal at all times. The pressure exteriorly of the sealing ring will then act only on the inner surfaces 63 and 64 of the rings 59 and 60, respectively, tending to force them axially apart and thus the rings 53 and 54 into positive sealing engagement with the bottoms of the recesses or counterbores 34 and 35 and the outer surface of the cover thrust plate 25. The employment of the fiber rings 57 and 58 accomplishes a positive sealing means and prevents extrusion of the synthetic material sealing rings.

The thin cover thrust plate 25 may be made as a brass or bi-metal construction. This plate serves as a diaphragm and it is larger in diameter than the gear diameters, being peripherally supported on the interface 3 of the body and cover. The thrust plate 25 will then not ordinarily engage the sides of the gears 11 and 12 except by deflection due to the aforementioned over-all end clearance of the gears of .000 to .002 inch between the body thrust plate 20 and the parting surface 3.

As seen in FIGS. 10 and 11, there is illustrated an alternative form of cover thrust plate 65, which like the thrust plate 25, is provided with apertures 66 and 67 to receive the shafts 13 and 10, respectively. On certain tests of the pump of the present invention, it was found that there was an area at the inlet side of the pump where high pressure reacted so violently with the thrust plate that the wear to such plate adjacent the inlet port was quite severe. In order to eliminate this wear, the thrust cover plate 65 is milled out as indicated at 68 in a triangular shape undercut. One side of the undercut is parallel and adjacent the edge of the plate 65 as seen at 69 and the other two sides are arcuate as shown at 70 and 71, the radius of such arcs being the eccentric centers of the sealing rings.

It can now be seen that the sealing rings of the present invention are eccentrically offset toward the inlet side of the pump as indicated by the arrow 73 in FIG. 2. The sealing rings of course, segregate pressure zones on the exterior of the cover thrust plate 25. Interiorly of the sealing rings, a low pressure zone will be generally provided. The passages 74 and 75 seen in the cover and body, respectively, in FIG. 1, may be maintained at reduced pressure as by a suitable connection to the inlet side of the pump. The passage 74 is in communication with the outer surface of the cover thrust plate 25 interiorly of the rings 32 and 33 by means of longitudinally extending grooves or passageways 76 and 77 in the bearings 16 and 18, respectively. Between the recess 30 for the cover thrust plate 25 and the counterbores 34 and 35, there is provided an intermediate recess 78 having a figure-eight peripheral configuration. Such recess 78 provides a chamber in the cover 2 to which the outlet side of the pump may be connected by suitable porting, not shown, so that high pressure will be acting on the outside of the cover thrust plate 25 exteriorly of the sealing rings 32 and 33. It will accordingly be seen that the eccentricity of the rings toward the inlet side 73, likewise offsets the high pressure chamber 78 exteriorly of such rings toward the outlet side thus balancing the high pressures developed in the pumping cavity 23 on the outlet side.

In FIG. 12, there is illustrated an alternative sealing ring similar to that shown in FIGS. 8 and 9 which consists of an inner ring 80 provided with a centrally disposed outwardly projecting annular ridge 81. Annular angle or L-shaped members 82 and 83 are seated on such ring on each side of the ridge 81 and sealing rings 84 and 85 are mounted thereon. An outer ring 86 bridges the axially facing legs of the rings 82 and 83 and confines the seal rings 84 and 85. Such outer ring 86 is provided with one or more apertures 87 providing high pressure fluid communication to the interior of the seal in annular chamber 88. The rings 82 and 83, which form a non-extrusion seal may be made of Teflon, soft aluminum, brass or other suitable plastic or metal pliable material. The high pressure acting on the axial walls of the chamber 88 will force the rings 82 and 83 axially outwardly to form a substantially perfect non-extrusion seal between the high and low pressure zones of the pump.

The rings illustrated in detail in FIGS. 7 or 12 will preferably have an interference fit between the pressure plate 25 and the cover counterbores 34 and 35, such interference fit being in the range of from .010 to .020 inch. This will then asure initial proper seating of the rings and the high working pressures developed exterionly of the rings will further ensure a metal-to-metal or plastic contact.

It can now be seen that there is provided a pressure loaded gear type pump having a unique diaphragm type cover thrust plate which is peripherally clamped between the interface of the cover and body forming the pump housing and which is further firmly supported by the eccentric seal rings on the inlet side of the pump thus eccentrically disposing a chamber connected to the outlet side of the pump toward the outlet side of the pump cavity. Moreover, with the unique bearing construction illustrated in FIG. 4, the eccentric rings may be offset as far as possible with respect to the centers of the gears and yet the shafts projecting from the counterbores 34 and 35 will still be provided with a semi-circular bearing projection 90 seen in such FIG. 4. Further, no complex grooving or multi-part thrust plates are provided and the bearings for the gear shafts are fixed and not in any way loaded or axially movable.

Other modes of applying the principle of the invention may be employed, change being made as regards the details described, provided the features stated in any of the following claims or the equivalent of such be employed.

I, therefore, particularly point out and distinctly claim as my invention:

1. In a pressure loaded gear type pump having a cavity for meshing gears, a housing for said gears comprising a body and a cover connected thereto, cover thrust plate means peripherally clamped between said body and cover and extending across one side of said meshing gears, counterbores in said cover surrounding the axes of said meshing gears and eccentrically disposed with respect thereto toward the inlet side of said pump, seal rings mounted in said counterbores and engaging said cover and cover thrust plate, and a chamber in said cover exteriorly of said seal rings eccentrically disposed with respect to the axes of said meshing gears toward the outlet side of said pump, said chamber being high pressure loaded to compensate for the high pressure loading in said cavity in the body for said meshing gears.

2. A pump as set forth in claim 1 wherein said seal rings comprise two metallic rings axially movable with respect to each other, and means responsive to high pressure exteriorly of said rings to move said two metallic rings relatively axially away from each other to form a metal-to-metal seal between said cover and said cover thrust plate, said last-mentioned means comprising a synthetic material seal ring interposed between said two metallic rings.

3. A gear type pump as set forth in claim 1 including a relieved portion on the inlet side of said cover thrust plate whereby severe wear to the thrust plate adjacent the inlet port of the pump will be avoided.

4. A pump as set forth in claim 1 wherein said seal rings comprise at least two metallic rings, a synthetic material ring interposed therebetween, and means responsive to high pressure exteriorly of said rings to separate said metal rings axially and to form a metal-to-metal seal between said cover and said cover thrust plate while preventing such synthetic material ring from extruding between said metallic rings.

5. A pump as set forth in claim 1 wherein said rings each comprise an inner metallic ring, L-shaped rings supported on each end of said inner ring by means of synthetic material seal rings, and fiber ring means interposed between said seal rings and said L-shaped rings having an interference fit with said inner ring operative to preclude extrusion of said synthetic material rings when said ring is subjected to high exterior pressures.

6. A pump as set forth in claim 1 wherein said rings each comprise an inner metallic ring, L-shaped rings supported on each end of said inner ring, synthetic material rings supported on said L-shaped rings, an outer ring bridging said L-shaped rings and forming with said synthetic material rings an annular chamber therebetween, and ports in said outer ring providing high pressure fluid communication to such annular chamber.

7. A pump as set forth in claim 1 wherein said seal rings include means operative to convert radial pressure loads into lateral thrust loads thus to force said seal rings into fluid-tight engagement with said cover and said cover thrust plate.

8. A pump as set forth in claim 1 including shafts journaled in said body and cover for said meshing gears, and bearings in said cover supporting said shafts, that portion of said bearings which projects into said counterbores being sufficiently cut away to permit a portion of said eccentrically disposed seal rings to be disposed directly adjacent said shafts.

9. A pump as set forth in claim 8 wherein said bearings are immovable and are separate from said thrust plate and seal rings.

10. A pump as set forth in claim 8 wherein said bearings are provided with longitudinally extending groove means for directing low pressure fluid interiorly of said seal rings.

11. A gear type pump comprising a body and a cover attached thereto forming a housing for said pump, shafts journaled in said body and cover and having thereon meshing gears, a cover thrust plate peripherally clamped between said body and cover, counterbores in said cover surrounding the axes of said gear shafts and eccentrically disposed with respect thereto toward the inlet side of said pump, and seal rings in said counterbores surrounding the respective gear shafts and interposed between said cover thrust plate and said cover, said seal rings engaging said cover and cover thrust plate to form a high pressure chamber exposed to the exterior of said cover thrust plate and eccentrically disposed toward the outlet side of said pump.

References Cited in the file of this patent

UNITED STATES PATENTS

| | | |
|---|---|---|
| 2,044,873 | Beust | June 23, 1936 |
| 2,702,509 | Garnier | Feb. 22, 1955 |
| 2,809,592 | Miller et al. | Oct. 15, 1957 |
| 2,824,522 | Compton | Feb. 25, 1958 |
| 2,923,248 | Hodgson | Feb. 2, 1960 |
| 3,019,737 | Prasse | Feb. 6, 1962 |
| 3,050,010 | Thrap et al. | Aug. 21, 1962 |
| 3,055,307 | Thrap | Sept. 25, 1962 |
| 3,068,804 | Thrap et al. | Dec. 18, 1962 |
| 3,096,719 | McAlvay | July 9, 1963 |
| 3,101,673 | Clark et al. | Aug. 27, 1963 |

FOREIGN PATENTS

| | | |
|---|---|---|
| 769,763 | Great Britain | Mar. 13, 1957 |